UNITED STATES PATENT OFFICE.

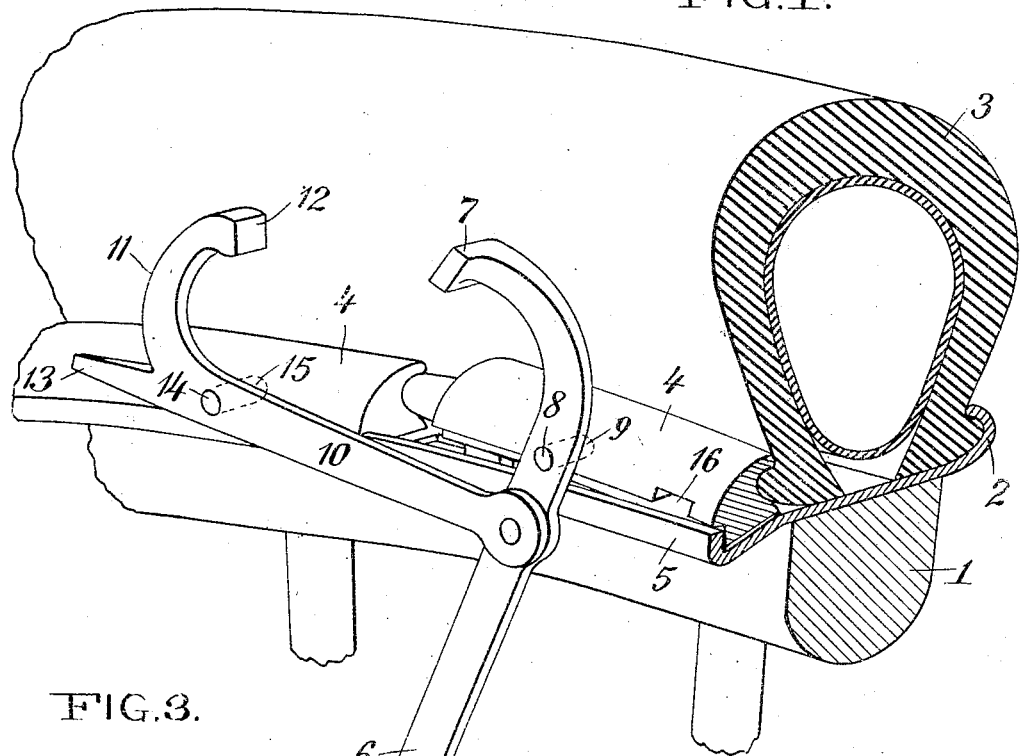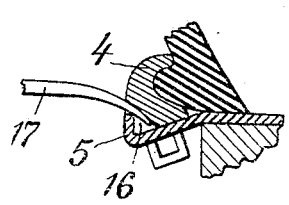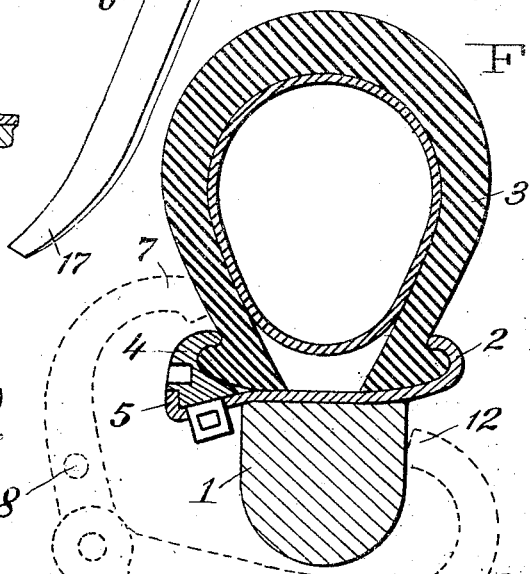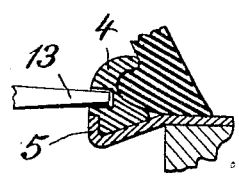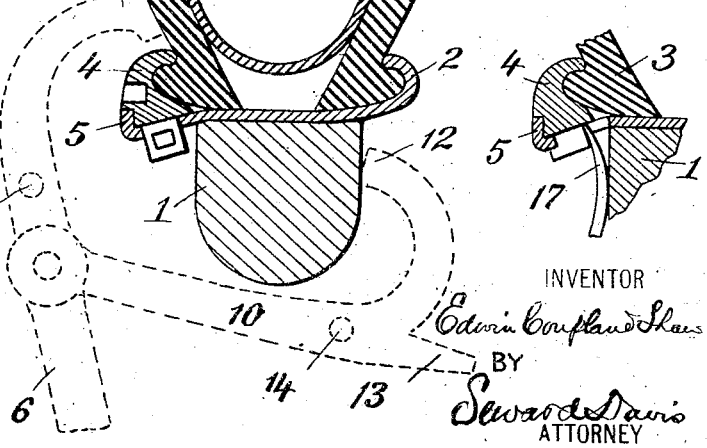

EDWIN COUPLAND SHAW, OF AKRON, OHIO, ASSIGNOR TO THE B. F. GOODRICH COMPANY, OF AKRON, OHIO, A CORPORATION OF OHIO.

TIRE-TOOL.

No. 832,170.   Specification of Letters Patent.   Patented Oct. 2, 1906.

Application filed January 6, 1906. Serial No. 294,832.

*To all whom it may concern:*

Be it known that I, EDWIN COUPLAND SHAW, a citizen of the United States, residing at the city of Akron, county of Summit, and State of Ohio, have invented certain new and useful Improvements in Tire-Tools, of which the following is a specification, reference being had to the accompanying drawings, which form a part thereof.

My invention relates to that class of tools adapted for use with detachable tires for vehicle-wheels, and more particularly for use with an improved form of vehicle-wheel rim which I have described and claimed in a companion application, in which one tire-flange is made removable.

The object of my invention is to provide a simple combination-tool which will facilitate the performance of many of the operations necessary in the use of detachable tires and with rims having a detachable tire-flange.

In the drawings, Figure 1 is a perspective view of a section of a tire and rim and a perspective view of my improved tool, showing its mode of operation when used in connection with the detachable tire-flange. Fig. 2 is a cross-section of a felly, rim, and tire, showing the use of my device when employed for detaching tires which are "frozen" to the rim. Fig. 3 is a cross-section of a portion of a rim and detachable flange, showing a mode of using my device for removing the detachable tire-flange. Fig. 4 is a cross-section of a portion of the rim and detachable flange, showing the method of using my device for cleaning dust and dirt from portions of the rim structure which are likely to become clogged. Fig. 5 is a cross-section of a portion of the rim and detachable flange, showing the operation of a part of my device when used for forcing the removable flange into its locked position.

In Fig. 1, 1 the wheel-felly; 2, the tire-rim; 3, the tire, here shown as of the double-tube clencher type.

4 is a removable cross split ring, upon which is formed one tire-flange, the said ring being retained upon the rim by means of the flange 5 and lugs upon the under sides of the terminals of the ring, which are adapted to enter a slot in the rim and to be locked therein.

The tire-tool consists of the shaft 6, one end of which is bent to form a curve, the length of which is approximately one-quarter the entire length of the shaft and the curvature of which is similar to that of a circle having a three-inch radius. The curved portion terminates in an enlarged head 7, having a flattened face which forms the end of the shaft. Upon the shaft at a point slightly below the beginning of the curved portion is inserted a pin or stud 8, which is adapted to engage within a socket 9 drilled in the split ring near its terminal. The lower extremity 17 is tapered somewhat similar to the shaft of a screw-driver. In addition, this end is curved slightly in a direction perpendicular to the plane of the curved portion of the shaft. At a point slightly below the pin 8 is pivoted an arm 10, having a length slightly greater than half the length of the shaft 6. This arm is substantially straight a greater part of its length and terminates in a curved portion 11, having a length substantially equal to one-third the entire length of the arm 10 and a curvature similar to that of a circle having a one-inch radius. This portion 11 is curved toward the head 7 and terminates in a similar head 12, also having a flattened face. Below this curve and extending in the line of the main portion of the arm 10 is a spur 13, which is tapered almost to a point. Upon the arm 10 at a point near the beginning of the curved portion is a pin or stud 14, extending in the same direction as the pin 8 and adapted to enter a socket 15, drilled in the other ring-terminal in a position corresponding to that of the socket 9.

This device is adapted to perform a number of functions incidental to the use of removable tires in general, and particularly to the use of rims of the type shown, having the detachable tire-flange. The detachable flange, or the split ring upon which it is formed, is proportioned to fit closely about the main portion of the rim or within a groove provided for it thereon. As this split ring is usually made of metal, it is often found difficult to draw its terminals together, which must be done in order to bring the locking means into engagement. I therefore use the tool in the manner shown in Fig. 1. The stud 14 is inserted in the socket 15 and the stud 8 in the socket 9, whereupon by exerting pressure upon the shaft 6 the ring-terminals can be made to approach one another and the locking means brought into engagement.

As far as this operation is concerned the device acts substantially as a lever of the second class. In some other forms of tire-rims having detachable flanges certain forms of split ring are used which must be expanded in operation, instead of contracted, and for this purpose my device can be used in a precisely similar way, except that the pressure is exerted upon the shaft 6 in the opposite direction.

It frequently happens that after long use vehicle-tires adhere to the rims or become frozen thereto, and it is sometimes difficult to remove said tires. In such a case I use my device as shown in Fig. 2. The head 12 is seated against one side of the wheel-felly. The head 7 is seated against the opposite side of the tire or the tire-casing, whereupon by exerting pressure upon the shaft 6 the tire can be loosened. In this operation the tool performs the functions of a lever of the first class.

When it is desired to remove the detachable tire-flange, the locking means frequently bind on account of the pressure exerted upon them, and sometimes become rusted in place, rendering the operation of removing the tire-flange extremely difficult. To obviate this, I cut a small groove or channel 16 in one edge of the detachable flange in such a manner that when the said detachable flange is in position the edge of this channel is slightly above the edge of the retaining-flange 5. The end of the shaft 6 can then be inserted, as shown in Fig. 3, which enables the split-ring terminal to be forced upward.

The sockets 9 and 15 and the rim-slots sometimes become filled with dirt, and to remove this foreign matter the spur 13 can be used, as shown in Fig. 4.

Many of the detachable flanged tire-rims are locked by inserting a lug mounted upon the under side of one ring-terminal in a slot provided therefor in the rim and forcing the said lug and the terminal to which it is attached outward away from the felly. If this operation is found difficult, it can be greatly facilitated by the use of the curved extremity of the socket 6 in the manner shown in Fig. 5.

Having described my invention, what I claim is—

1. A tire-tool comprising a lever, an arm pivoted thereto at a point above the center of said lever, and a pair of similarly-projecting studs, one located upon the lever at a point above the arm-pivot, and the other upon the said arm near its free extremity.

2. In a tire-tool the combination of the lever 6, the somewhat shorter arm 10 pivoted thereto at a point somewhat above the center of said lever, said lever and said arm having their extremities curved inwardly toward each other; and the similarly-projecting studs 8 and 14 located upon the said lever and said arm at points adjacent to their respective curved portions.

3. A tire-tool comprising the lever 6 having its upper extremity curved for a distance approximating one-quarter the length of said lever, a somewhat shorter arm 10 pivoted to said lever at a point above its center, said arm terminating in a bifurcated portion, one part being curved toward the curved portion of said lever, the other part consisting of a straight spur; said lever and said arm having similarly-projecting studs located at points adjacent to their respective curved portions.

4. A tire-tool comprising the lever 6 terminating in a curved portion of one-quarter its total length and provided with an enlarged and flattened head, an arm 10 pivoted to said lever at a point above the center of said lever, said arm terminating in a bifurcated portion, one part consisting of a spur 13, the other a curved portion oppositely disposed to the curved portion of said lever and similarly shaped, but of slightly greater curvature, said lever and arm having the studs 8 and 14 located at points adjacent to their respective curved portions, the lower extremity of said lever being tapered and slightly curved in a direction perpendicular to the plane of rotation of the pivoted arm, substantially as set forth.

EDWIN COUPLAND SHAW.

Witnesses:
C. C. GOODRICH
W. K. MEANS.